UNITED STATES PATENT OFFICE.

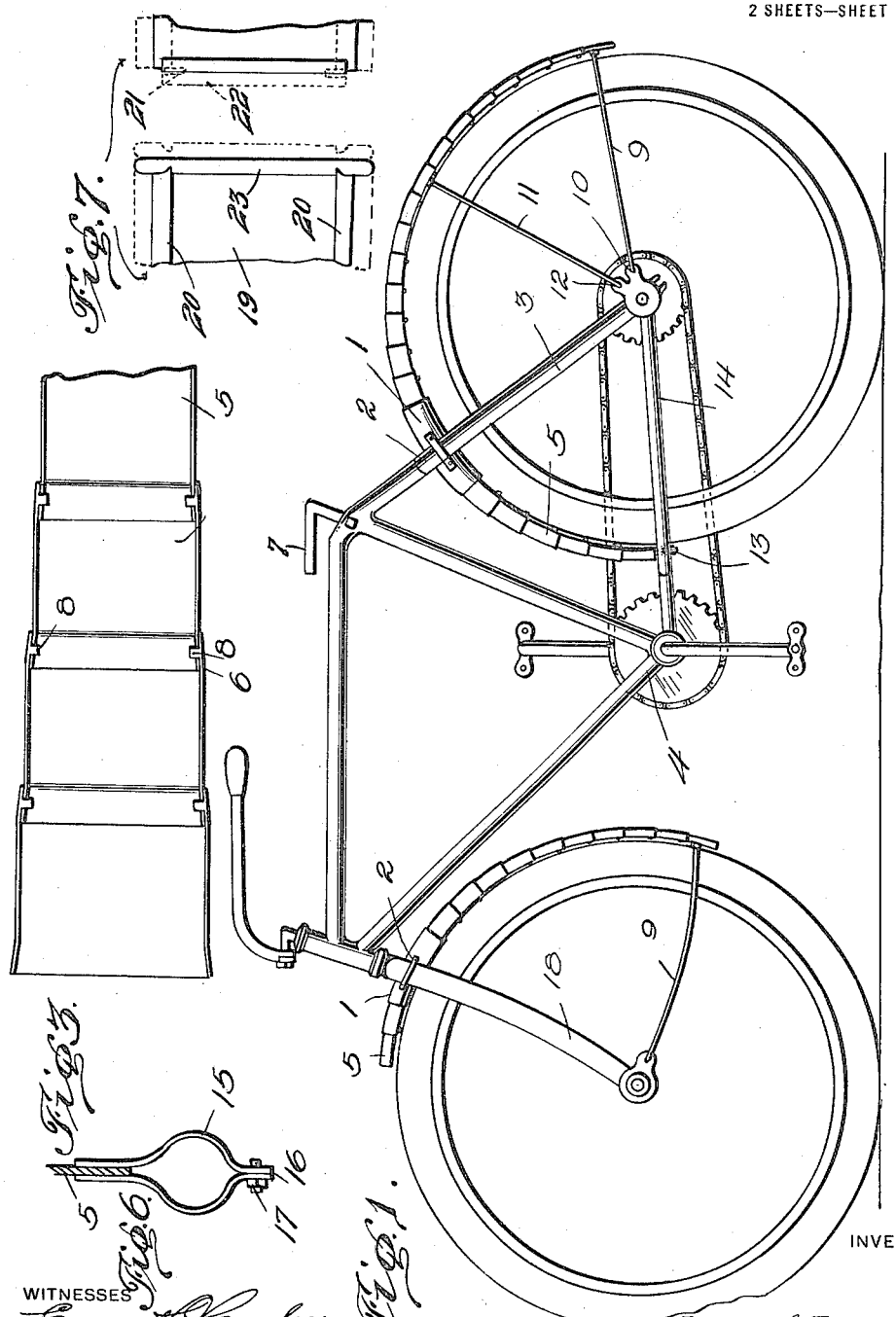

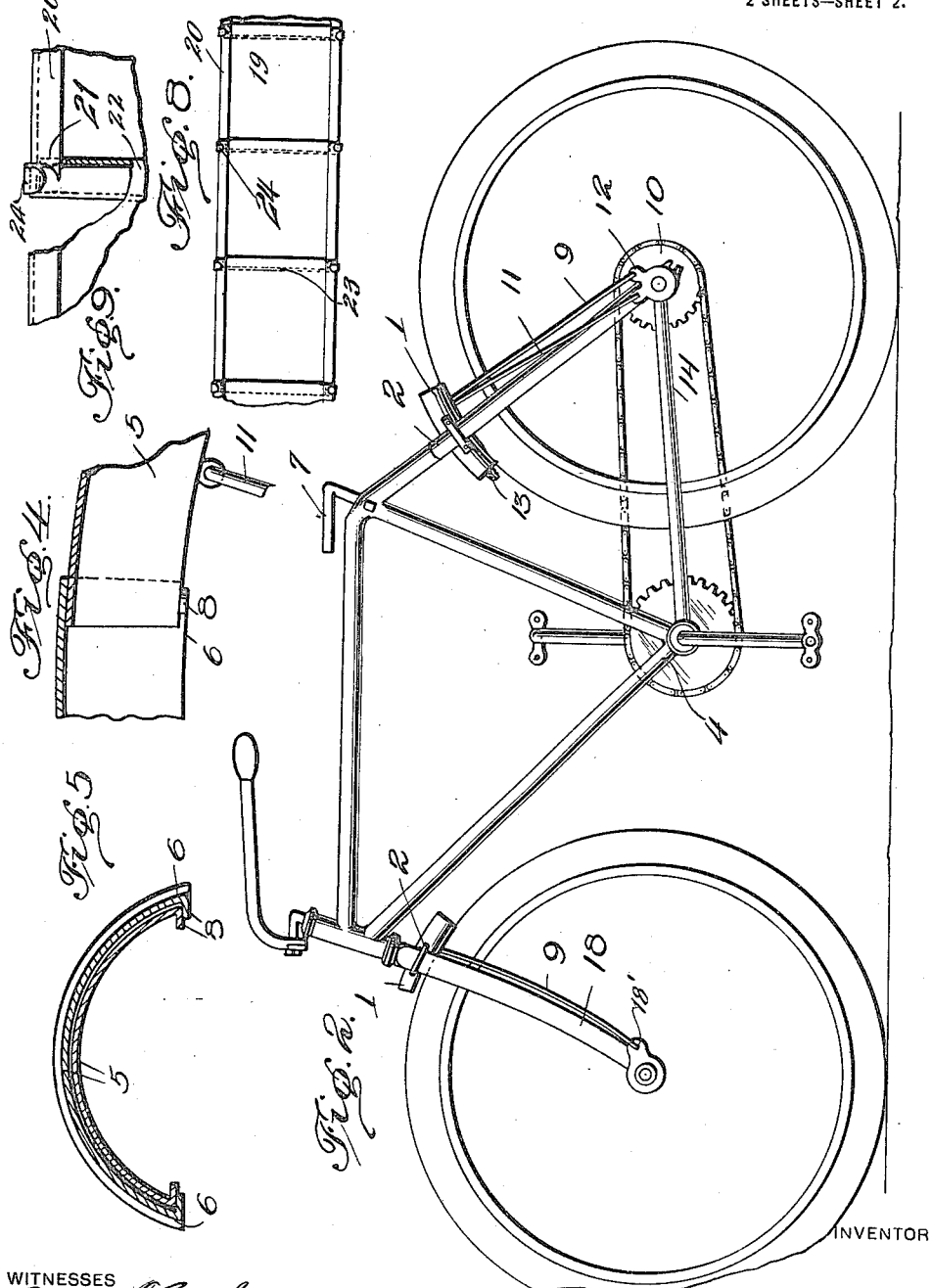

KAZIMIR A. FIALKOWSKI, OF BROOKLYN, NEW YORK.

BICYCLE MUD-GUARD.

1,226,323. Specification of Letters Patent. Patented May 15, 1917.

Application filed March 23, 1916. Serial No. 86,206.

*To all whom it may concern:*

Be it known that I, KAZIMIR A. FIALKOWSKI, a subject of the Czar of Russia, residing at Brooklyn, in the county of Kings and State of New York, have invented certain new and useful Improvements in Bicycle Mud-Guards, of which the following is a specification.

This invention has relation to certain new and useful improvements in mud guards for bicycles and has for its primary object the provision of a mud guard of this character which will be of simple construction and may be readily attached or removed from the bicycle.

The invention has for another object, the provision of a mud guard of this character composed of telescoping sections connected in such manner that the complete guard may be readily forced into an inclosing case provided for the same and serving also to connect the oppositely extending portions of said guard.

The invention has for a further object, the provision of a mud guard of this character which may be readily extended or placed in a collapsible condition while upon the bicycle.

A still further object of the invention resides in the provision of a mud guard of this character in which the sections may be connected in a novel and improved manner, novel means also being provided for securing one end of the rear guard to the frame when extended.

With the above and other objects in view, the invention resides in the novel combination and arrangement of the coöperating parts as will be hereinafter more clearly set forth, pointed out in the appended claim, and shown in the accompanying drawings, in which:

Figure 1 is an elevation of a bicycle provided with my improved form of guard shown in extended position;

Fig. 2 is a view similar to Fig. 1, showing the guard in collapsed position;

Fig. 3 is a bottom plan of a section of the guard;

Fig. 4 is a fragmentary longitudinal section of the same;

Fig. 5 is a detail transverse section;

Fig. 6 is a detatil view of the securing means for one end of the guard;

Fig. 7 is an enlarged detail of the adjacent ends of two sections of a modified form of the device;

Fig. 8 is a bottom plan of several sections of the modified form connected and in extended position;

Fig. 9 is a fragmentary detail view showing the manner in which the sections are connected.

Referring more particularly to the drawings in which similar reference characters designate corresponding parts throughout the several views, 1 designates the case which may be secured by suitable securing straps 2 in the upper end of the rear fork 3 of the bicycle frame 4. The case 1 is preferably of the semicircular form in cross section and is adapted to inclose the opposite sections of the guard. The case 1 projects for some distance to either side of the fork 3 and the forward and rear sections of the guard are formed of telescoping members 5 gradually decreasing in size toward the free ends of said sections in order that the members 5 may be moved into one another. Each member is provided at its forward end with guide lugs 8 which project inwardly from opposite sides of said member 5 toward the longitudinal center of the latter to guide the member 5 adapted to slide in the member by which the lugs 8 are carried. This structure will be readily understood by referring to Figs. 3 and 4 of the drawings.

It will be understood that the inner member 5 of each section of the guard is slidably connected with the case 1 so that they may slide longitudinally therein which will permit these telescoping sections to be entirely inclosed therein.

It will also be understood that a pair of supporting and guiding rods 9 are secured to the opposite side edge of the outermost member 5 of the rear section of the mud guard and pivoted in a suitable manner as shown at 10 to the frame at the lower end of the fork 3. A second pair of guiding and supporting rods 11 are secured to the opposite side edges of an intermediate member 5 of the rear section of the mud guard and pivoted in a suitable manner as shown at 12 to the frame at the lower end of the fork 3. It will therefore be seen that the rear section of the mud guard will be properly supported in position from the rear wheel of the bicycle when extended, although the supporting and guiding rods 9 and 11 will not interfere with closing of the rear section of the mud guard, as the rods 9 and 11 will be folded against one another and against the rear fork 3. The rods 9 and 11 will also serve to hold the members 5 in proper position during movement of the same to extended or collapsed position, and assist the guide lugs 8 in preventing the members 5 from dropping out of one another.

The lower end of the forward section of the mud guard is secured to the usual cross bar 13 connecting the parallel lower bars 14 of the frame by the spring clamp arms 15 secured to the lower end of the forward mud guard section and having bulged portions for engagement around the cross bar 13 while the free ends 16 of said spring clamp arms 15 are brought to parallel position and adapted to be brought together by a suitable clamping member 17 engaged through the same.

I have also shown a front mud guard which is constructed in substantially the same manner as the rear mud guard, the case 1 being secured in a similar manner in the upper end of the fork 18. This forward mud guard is shown as being provided with only one pair of supporting and guiding rods 9 which are pivotally connected with the fork 18 as indicated by the numeral 18'. It will be understood, however, that any suitable number of supporting and guiding members may be provided. It will also be seen that the front mud guard is shown as having only a few telescoping members 5 for this forward section, but any suitable number may be provided, and this section may be connected and supported upon the forward fork 18 when extended in any desired manner.

In Figs. 7 to 9, inclusive, I have shown a slightly modified form of the invention, in which the mud guard is composed of a plurality of curved or concavo-convex members 19 which have their opposite side edges 20 turned back upon their concave faces to form guides in which are received the free ends 21 of the bent-back rear edges 22 of the member 19 sliding in the first-mentioned member. It will be understood that the rear edge 22 of each member 19 is bent back toward the outer or convex face of said member 19. Each member 19 also has its forward edge 23 bent back toward the concave face of said member to form a stop to limit the forward movement of the member 19 sliding in the first-mentioned member 19, it being understood that the bent-back rear edge 22 of the second-mentioned member 19 will slide under the forward bent back edge 23 of the first-mentioned member 19 as the second mentioned member 19 is withdrawn from the first-mentioned member 19. This may be readily understood by referring to Figs. 8 and 9 of the drawings.

By referring to Figs. 8 and 9 of the drawings it will also be seen that I have provided additional guide members 24 which are produced by bending over the ends of the bent-back edges 23, said guide members 24 extending around the side edges of the member 19 which slides in the member 19 by which the guide members 24 are carried. This will result in retaining the members 19 in proper position during sliding movement of the same and prevent the members 19 from swinging upon one another.

It will be seen that all of the members 19 slightly decrease in size and which when extended provide a mud guard which will thoroughly protect the frame of the bicycle as well as the clothes of the party riding the bicycle or motorcycle to which the mud guard may be attached. It will also be evident that this form of the device may be readily and cheaply manufactured.

While the preferred embodiments of the invention have been shown and described, it will be understood that many minor changes in the details of the construction and arrangement of the parts may be resorted to within the scope of the appended claim without departing from the spirit of the invention and without sacrificing any of the advantages of the same.

What is claimed is:—

The combination with a bicycle, of a mud guard for the same comprising a longitudinally and transversely bowed and open-ended casing mounted on the frame thereof, a plurality of like telescoping sections carried thereby, means for connecting one of the end sections with the bicycle frame, a pair of supporting arms having their lower ends pivotally connected with the bicycle frame and their upper ends connected with one of the telescoping sections adapted to be swung away from the bicycle frame when the sections are extended.

In testimony whereof I affix my signature in presence of two witnesses.

KAZIMIR A. FIALKOWSKI.

Witnesses:
 FRANKLIN P. WOLFF,
 PETER G. BREDES.